US012804494B2

(12) United States Patent
Bae et al.

(10) Patent No.: US 12,804,494 B2
(45) Date of Patent: Nov. 17, 2026

(54) METHOD AND APPARATUS FOR SIGNALING OVERHEAD REDUCTION

(71) Applicant: ELECTRONICS AND TELECOMMUNICATIONS RESEARCH INSTITUTE, Daejeon (KR)

(72) Inventors: Hyung Deug Bae, Daejeon (KR); Sook Yang Kang, Daejeon (KR); Jae Wook Shin, Daejeon (KR); Sung Min Oh, Daejeon (KR); Soon Yong Lim, Daejeon (KR); Sung Gu Choi, Daejeon (KR); You Sun Hwang, Daejeon (KR)

(73) Assignee: ELECTRONICS AND TELECOMMUNICATIONS RESEARCH INSTITUE, Daejeon (KR)

( * ) Notice: Subject to any disclaimer, the term of this patent is extended or adjusted under 35 U.S.C. 154(b) by 338 days.

(21) Appl. No.: 18/507,344

(22) Filed: Nov. 13, 2023

(65) Prior Publication Data

US 2024/0163759 A1 May 16, 2024

(30) Foreign Application Priority Data

Nov. 14, 2022 (KR) ........................ 10-2022-0151852
Nov. 9, 2023 (KR) ........................ 10-2023-0154815

(51) Int. Cl.
*H04W 36/00* (2009.01)
*H04W 36/08* (2009.01)

(52) U.S. Cl.
CPC ..... *H04W 36/087* (2023.05); *H04W 36/0072* (2013.01); *H04W 36/0009* (2018.08)

(58) Field of Classification Search
CPC ........... H04W 36/087; H04W 36/0072; H04W 36/0009; H04W 36/0033
See application file for complete search history.

(56) References Cited

U.S. PATENT DOCUMENTS

2017/0244705 A1 8/2017 Ha et al.
2019/0150213 A1 5/2019 Kim et al.
2021/0368409 A1* 11/2021 Liu .................. H04W 36/0033
2022/0014976 A1 1/2022 Luo et al.
2022/0015010 A1 1/2022 Akl et al.
(Continued)

FOREIGN PATENT DOCUMENTS

KR 10-2022-0046554 A 4/2022
WO WO-2021142801 A1 * 7/2021
WO WO-2024003783 A1 * 1/2024

*Primary Examiner* — Michael Thier
(74) *Attorney, Agent, or Firm* — LRK PATENT LAW FIRM

(57) ABSTRACT

A method of an integrated access and backhaul (IAB) node may include: receiving, from a target base station, one or more user equipment (UE) context setup request messages including terminal radio resource reconfiguration information; sharing context information including the terminal radio resource reconfiguration information with a source IAB-distributed unit 1 (IAB-DU1); configuring terminal reconfiguration information using the shared context information; and transmitting one or more UE context setup response messages including the terminal reconfiguration information to the target base station in response to the one or more UE context setup request messages.

12 Claims, 11 Drawing Sheets

(56) References Cited

U.S. PATENT DOCUMENTS

| | | | | |
|---|---|---|---|---|
| 2022/0086718 | A1 | 3/2022 | Akl et al. | |
| 2022/0217570 | A1 | 7/2022 | Akl et al. | |
| 2022/0369177 | A1 | 11/2022 | Cao et al. | |
| 2023/0247514 | A1* | 8/2023 | Li | H04W 92/20 |
| 2023/0292213 | A1* | 9/2023 | Bulakci | H04W 36/326 |
| 2023/0345326 | A1* | 10/2023 | Lu | H04W 36/08 |
| 2023/0362745 | A1* | 11/2023 | Huang | H04W 40/36 |

* cited by examiner

METHOD AND APPARATUS FOR SIGNALING OVERHEAD REDUCTION

CROSS-REFERENCE TO RELATED APPLICATIONS

This application claims priority to Korean Patent Applications No. 10-2022-0151852, filed on Nov. 14, 2022, and No. 10-2023-0154815, filed on Nov. 9, 2023, with the Korean Intellectual Property Office (KIPO), the entire contents of which are hereby incorporated by reference.

BACKGROUND

1. Technical Field

Exemplary embodiments of the present disclosure relate to a technique for reducing signaling overhead in an integrated access and backhaul (IAB) system, and more specifically, to a technique for reducing signaling overhead by reducing a message size and decreasing the number of messages in an IAB system.

2. Description of Related Art

The integrated access and backhaul (IAB) technology enables coverage extension by semi-fixedly installing IAB nodes at cell edges. Recently, mobile IAB nodes are evolving to be mounted on moving vehicles such as trains, buses, and future air taxis (e.g., urban air mobility (UAM)) to provide mobile communication data services to passengers. These mobile vehicles can accommodate a large number of users, all of whom can be connected to the same mobile IAB node. However, performing a full migration procedure using the existing technique when the mobile IAB node is connected to user terminals may result in a significantly large signaling overhead. This is particularly pertinent due to a wireless section between a donor-gNB and the mobile IAB node, emphasizing the need to reduce excessive signaling overhead in the wireless section.

SUMMARY

Exemplary embodiments of the present disclosure are directed to providing a method and an apparatus for reducing signaling overhead in a communication system.

According to a first exemplary embodiment of the present disclosure, a method of an integrated access and backhaul (IAB) node may comprise: receiving, from a target base station, one or more user equipment (UE) context setup request messages including terminal radio resource reconfiguration information; sharing context information including the terminal radio resource reconfiguration information with a source IAB-distributed unit 1 (IAB-DU1); configuring terminal reconfiguration information using the shared context information; and transmitting one or more UE context setup response messages including the terminal reconfiguration information to the target base station in response to the one or more UE context setup request messages.

The method may further comprise: receiving, from a source base station, one or more UE context modification request messages including radio resource control (RRC) reconfiguration information; transmitting an RRC reconfiguration message including the RRC reconfiguration information to the terminal; and transmitting one or more UE context modification response messages to the source base station in response to the one or more UE context modification request messages.

Each of the one or more UE context setup request messages may include information indicating terminal reconfiguration information element(s) identical to terminal radio resource configuration information element(s) held by the source IAB-DU1, and/or new terminal reconfiguration information element(s) configured by the target base station.

The method may further comprise: receiving, from the target base station, one multi-UE context setup request message including a plurality of UE context setup request messages; transmitting, to the target base station, one multi-UE context setup response message including a plurality of UE context setup response messages; receiving, from a source base station, one multi-UE context modification request message including a plurality of UE context modification request messages; and transmitting, to the source base station, one multi-UE context modification response message including a plurality of UE context change response messages.

The RRC reconfiguration message may include information indicating cell configuration information element same as cell configuration information element(s) held by the serving cell, and/or new cell configuration information element(s) configured by a target cell.

The RRC reconfiguration message may include information indicating radio resource configuration information element(s) same as radio resource configuration information element(s) held by the serving cell, and/or new radio resource configuration information element(s) configured by a target cell.

According to a second exemplary embodiment of the present disclosure, an integrated access and backhaul (IAB) node may comprise at least one processor, and the at least one processor may cause the IAB node to perform: receiving, from a target base station, one or more user equipment (UE) context setup request messages including terminal radio resource reconfiguration information; sharing context information including the terminal radio resource reconfiguration information with a source IAB-distributed unit 1 (IAB-DU1); configuring terminal reconfiguration information using the shared context information; and transmitting one or more UE context setup response messages including the terminal reconfiguration information to the target base station in response to the one or more UE context setup request messages.

The at least one processor may further cause the IAB node to perform: receiving, from a source base station, one or more UE context modification request messages including radio resource control (RRC) reconfiguration information; transmitting an RRC reconfiguration message including the RRC reconfiguration information to the terminal; and transmitting one or more UE context modification response messages to the source base station in response to the one or more UE context modification request messages.

Each of the one or more UE context setup request messages may include information indicating terminal reconfiguration information element(s) identical to terminal radio resource configuration information element(s) held by the source IAB-DU1 and/or new terminal reconfiguration information element(s) configured by the target base station.

The at least one processor may further cause the IAB node to perform: receiving, from the target base station, one multi-UE context setup request message including a plurality of UE context setup request messages; transmitting, to the target base station, one multi-UE context setup response message including a plurality of UE context setup response messages; receiving, from a source base station, one multi-UE context modification request message including a plurality of UE context modification request messages; and transmitting, to the source base station, one multi-UE context modification response message including a plurality of UE context change response messages.

The RRC reconfiguration message may include information indicating cell configuration information element same as cell configuration information element(s) held by the serving cell and/or new cell configuration information element(s) configured by a target cell.

The RRC reconfiguration message may include information indicating radio resource configuration information element(s) same as radio resource configuration information element(s) held by the serving cell and/or new radio resource configuration information element(s) configured by a target cell.

The present disclosure provides methods for a base station to perform a group handover for a group of multiple terminals while reducing signaling overhead in a full migration procedure. According to exemplary embodiments of the present disclosure, when a handover occurs for a group of terminals connected to an IAB node, a signaling overhead between the IAB node and an IAB donor-gNB can be reduced. Accordingly, the performance of the communication system can be improved by using radio resources efficiently.

DETAILED DESCRIPTION OF THE EMBODIMENTS

Figure 1:
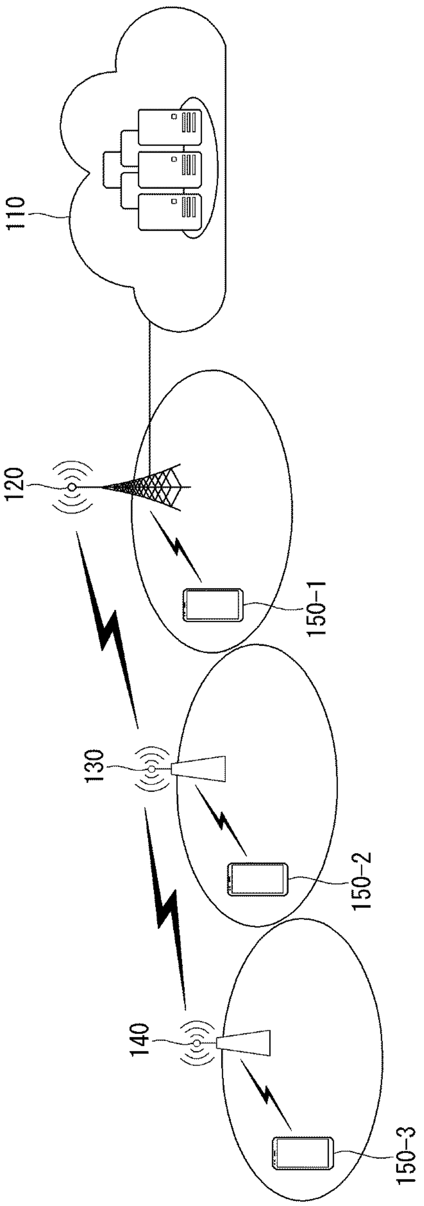
FIG. 1 is a conceptual diagram illustrating an exemplary embodiment of an integrated access and backhaul (IAB) network structure.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system or a memory system to which exemplary embodiments according to the present disclosure are applied will be described. The communication system or memory system to which the exemplary embodiments according to the present disclosure are applied is not limited to the content described below, and the exemplary embodiments according to the present disclosure may be applied to various communication systems. Here, a communication system may be used in the same sense as a communication network.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating an exemplary embodiment of an integrated access and backhaul (TAB) network structure.

Referring to FIG. 1, an TAB network 100 may include a core network 110, an IAB donor 120, and/or one or more TAB node 130 and 140. When the TAB network 100 supports 4G communication, the core network 110 may include a serving-gateway (S-GW), a packet data network (PDN)-gateway (P-GW), a mobility management Entity (MME), and the like. When the TAB network 100 supports 5G communication, the core network 110 may include a user plane function (UPF), a session management function (SMF), an access and mobility management function (AMF), and the like.

The IAB donor 120 and/or the TAB nodes 130 and 140 may support 4G communication (e.g., LTE, LTE-A), 5G communication (e.g., NR), 6G communication, and/or the like defined as the 3GPP technical specifications. In addition, the TAB network 100 may include one or more terminals 150-1, 150-2, and 150-3. Meanwhile, the IAB donor 120 and/or one or more TAB nodes 130 and 140 may operate in different frequency bands or may operate in the same frequency band. The IAB donor 120 and/or one or more TAB nodes 130 and 140 may be connected to each other through backhaul links. The IAB donor 120 and/or one or more TAB nodes 130 and 140 may be connected to the core network 110 through backhaul links. Each of the IAB donor 120 and/or one or more TAB node 130 and 140 may transmit signals received from the core network to the corresponding terminals 150-1, 150-2, and 150-3, and transmit signals received from the corresponding terminals 150-1, 150-2, and 150-3 to the core network 110.

Here, the IAB donor 120 may be responsible for centralized controls such as overall path configuration, topology management, handover, data routing path configuration, radio bearer mapping, and the like, according to a central unit (CU)/distributed unit (DU) split structure of the 5G radio access network (RAN). The IAB nodes 130 and 140 may transmit data. In addition, the IAB nodes 130 and 140 may provide services to the terminals 150-2 and 150-2. The IAB donor 120 may have a wired link with the core network 110, and serve as a base station for the IAB node 130 and the terminal 150-1 connected to the IAB network.

The IAB donor 120 may be connected to the core network 110 through a wired interface, and may be connected to the IAB node 130 through a wireless interface. The IAB node 130 may be connected to the IAB node 140 and the IAB donor 120 through wireless interfaces, and may serve as a relay node for the IAB node 140 in downlink and for the IAB donor 120 in uplink.

The IAB node 140 connected to the IAB node 130 may provide services to the terminal 150-3, and may operate in conjunction with the IAB node 130 for data transmission/reception. A backhaul adaptation protocol (BAP) may be used for data relay transmission between the IAB donor 120 and the IAB node 130 or between the IAB nodes 130 and 140. The BAP may perform a multi-hop data relay function, a function of mapping ingress radio link control (RLC) channels and egress RLC channels, and a routing function based RLC channels.

Figure 2:
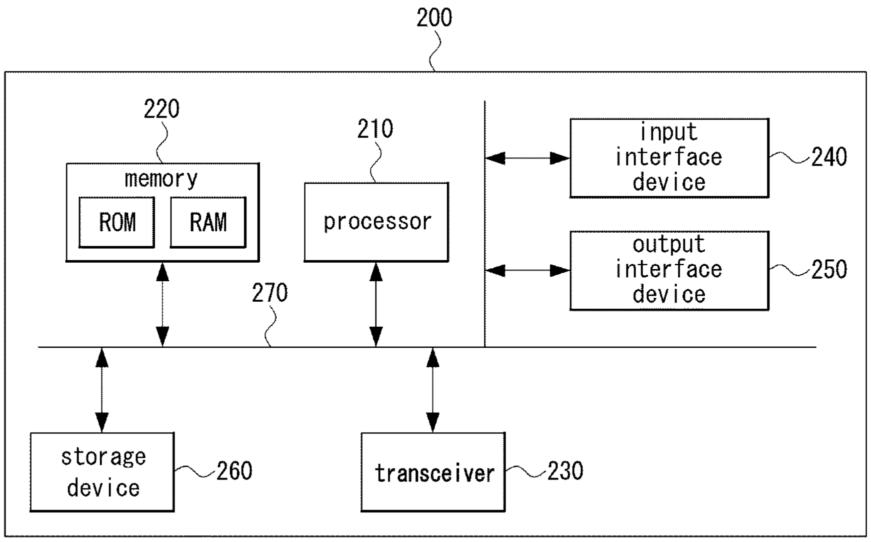
FIG. 2 is a block diagram illustrating an exemplary embodiment of a communication node included in the IAB network.

FIG. 2 is a block diagram illustrating an exemplary embodiment of a communication node included in the IAB network.

Referring to FIG. 2, a communication node 200 included in the IAB network may comprise at least one processor 210, memory 220, and/or transceiver 230. The communication node 200 described above may refer to one of the IAB donor and the IAB node. The above-described processor 210 may receive information on a plurality of divided time resources through the transceiver 230 to transmit and receive signals, and transmit the signals in one of the plurality of divided time resources through the transceiver 230. The above-described one time resource may be determined based on an IAB node list. The above-described transceiver 230 may be referred to as a transmission and reception module, a radio frequency (RF) unit, an RF module, or the like. In addition, the communication node 200 may further comprise an input interface device 240, an output interface device 250, a storage device 260, and the like. The components included in the communication node 100 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, the IAB network will be described in detail. In communication systems, high density of cells may be required to ensure service coverage, which may require installation of a large number of base stations and high maintenance costs. Accordingly, wireless backhauling technology can replace optical cables at low cost, and the IAB network technology can be used therefor. The IAB network can flexibly provide multi-hop-based wireless backhaul in a more cost-effective manner compared to wired backhaul. In addition, the IAB network can flexibly provide one-hop-based wireless backhaul in a more cost-effective manner compared to wired backhaul.

Meanwhile, the IAB nodes may be broadly classified into a fixed-type and a mobile-type. The fixed-type IAB node may be used to cost-effectively cover multiple service coverage holes. Alternatively, the fixed-type IAB node may be used to temporarily provide service coverage to a specific area. In addition, the mobile-type IAB node may be installed in various mobile objects such as vehicles, trains, and drones, and may provide services to devices of passengers on board or embedded Internet of things (IoT) devices.

Figure 3:
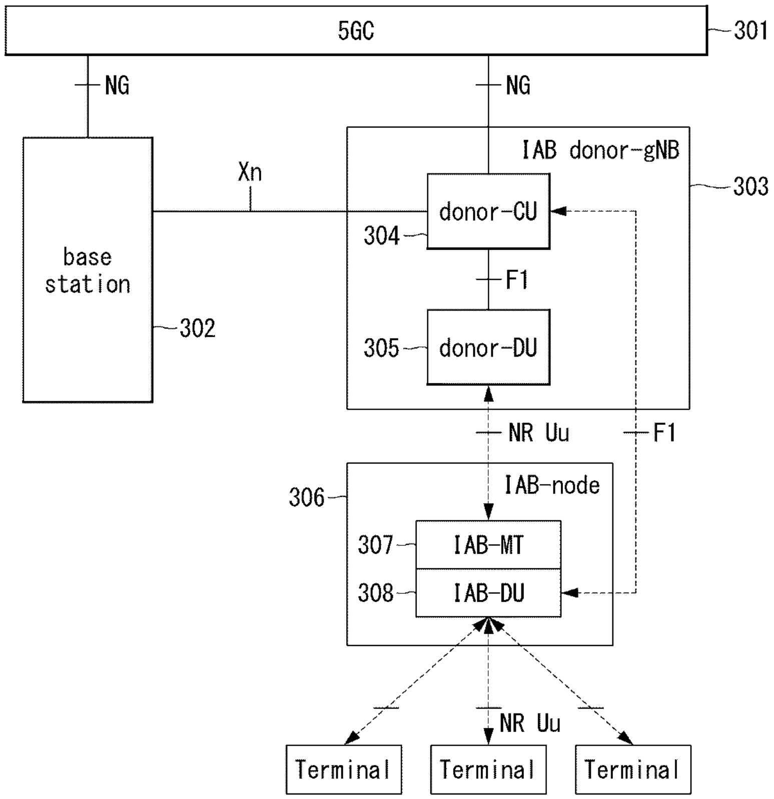
FIG. 3 is a block diagram illustrating an exemplary embodiment of a one-hop IAB network structure.

FIG. 3 is a block diagram illustrating an exemplary embodiment of a one-hop IAB network structure.

Referring to FIG. 3, a structural diagram of a one-hop IAB network is illustrated. The one-hop IAB network may comprise at least one of a 5G core network (5GC) 301, base station 302, IAB donor-gNodeB (gNB) 303, or IAB-node 306. The 5GC 301 may be connected to the base station 302 through a next generation (NG) interface. In addition, the 5GC 301 may be connected to a donor-CU 304 included in the IAB donor-gNB 303 through an NG interface.

The IAB donor-gNB 303 may include the donor-CU 304 and a donor-DU 305. The IAB donor-gNB 303 may include at least one donor-CU. The IAB donor-gNB 303 may include at least one donor-DU. The IAB donor-gNB 303 may perform a role of a base station for the IAB-node 306. In addition, the IAB donor-gNB 303 may be a base station that provides wireless connectivity to the IAB-node 306. The IAB donor-gNB 303 may be responsible for centralized controls such as overall path configuration, handover, routing configuration, and radio bearer mapping. Meanwhile, the IAB donor-gNB 303 may be referred to as 'IAB donor-node'.

The donor-CU 304 may be a node that supports radio resource control (RRC), service data adaptation protocol (SDAP), and packet data convergence protocol (PDCP) protocol layers of the IAB donor-gNB 303. In addition, the donor-CU 304 may perform an anchor function for control and data transmission/reception of the IAB network. The donor-CU 304 may be connected to the base station 302 through an Xn interface. The donor-CU 304 may be connected to the donor-DU 305 by wire through an F1 interface. The donor-CU 304 may be connected to an IAB-DU 308 of the IAB-node 306 through an F1 interface. The donor-CU 304 may be wirelessly connected to the IAB-DU 308. The donor-CU 304 may configure a cell of the donor-DU 305 through the F1 interface.

The donor-DU 305 may be a node that supports at least one of RLC, MAC, or PHY layers of the IAB donor-gNB 303. The donor-DU 305 may form one or more cells. The donor-DU 305 may be responsible for a data transmission/reception function for an IAB-mobile terminal (MT) 307. In addition, the donor-DU 305 may be connected to the IAB-MT 307 through an NR Uu interface. The donor-DU 305 may be wirelessly connected to the IAB-MT 307.

The IAB-node 306 may include at least one of the IAB-MT 307 or the IAB-DU 308. The IAB-node 306 may be divided into the IAB-DU 308 that performs base station functions and the IAB-MT 307 that performs terminal functions.

The IAB-MT 307 may provide terminal functions to the parent IAB node and the donor-DU 305. The IAB-MT 307 may include at least one of non-access stratum (NAS), RRC, SDAP, PDCP, radio link control (RLC), media access control (MAC), or PHY protocol layers to perform the terminal functions. In addition, the IAB-MT 307 may be connected to the donor-DU 305 through the NR Uu interface. Meanwhile, the IAB-MT 307 may operate based on configuration according to an RRC message of the donor-CU 304.

The IAB-DU 308 may provide base station functions to the terminal. The IAB-DU 308 may be connected to the terminal through an NR Uu interface. The IAB-DU 308 may be wirelessly connected to the terminal. In addition, the IAB-DU 308 may be connected to the donor-CU 304 through the F1 interface. The IAB-DU 308 may be wirelessly connected to the donor-CU 304.

The terminal may access the network through the NR Uu interface connected to the IAB-DU 308. The terminal may operate based on configuration according to an RRC message of the donor-CU 304.

Meanwhile, a multi-hop IAB network structure in which other IAB-nodes are connected to the IAB-node 306 may be derived from FIG. 3.

Figure 4:
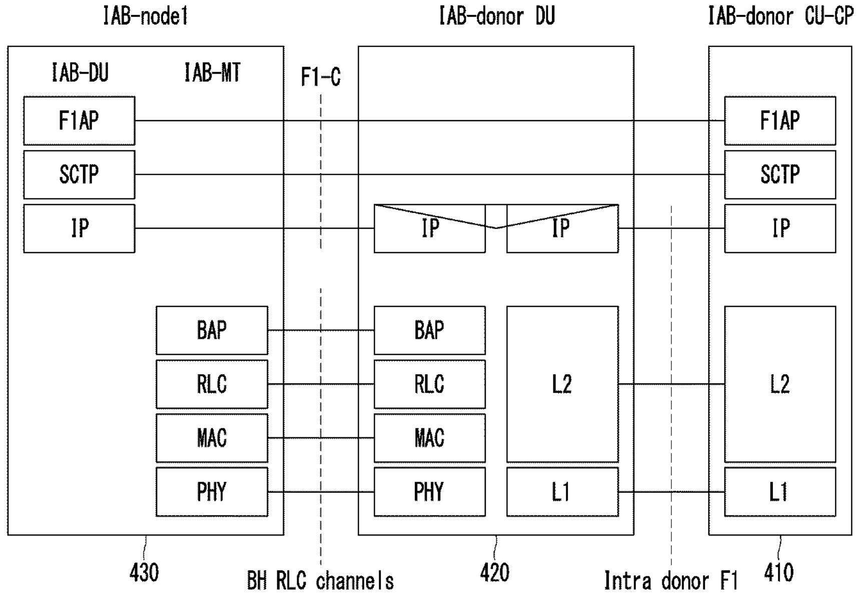
FIG. 4 is a block diagram illustrating an exemplary embodiment of a control plane protocol structure in the IAB network.

FIG. 4 is a block diagram illustrating an exemplary embodiment of a control plane protocol structure in the IAB network.

Referring to FIG. 4, a control plane (CP) protocol structure between an IAB-DU of an IAB-node 1 430 and an IAB-donor CU-CP 410. In the control plane protocol structure of the IAB network, an IAB-donor node may include a IAB-donor DU 420 and the IAB-donor CU-CP 410.

The IAB-donor CU-CP 410 may include at least one of an L1 layer, L2 layer, Internet protocol (IP) layer, stream control transmission protocol (SCTP) layer, F1-application protocol (F1-AP) layer, PDCP layer, or RRC layer.

The IAB-donor DU 420 may include at least one of an L1 layer, L2 layer, IP layer, PHY layer, MAC layer, RLC layer, or BAP layer. The IAB-donor CU 420 may transmit data received from the IAB-donor CU-CP 410 to the IAB-node 1 430.

The IAB-node 1 430 may include an IAB-DU and an IAB-MT. The IAB-DU may include at least one of an IP layer, SCTP layer, or F1-AP layer. In addition, the IAB-MT may include at least one of a PHY layer, MAC layer, RLC layer, or BAP layer. The BAP layer of the IAB-MT may perform a data relay function between the IAB-node 1 430 and the IAB-donor DU 420.

Meanwhile, in the control plane protocol structure of the IAB network, the IAB-donor DU 420 and the IAB-donor CU-CP 410 may be connected through intra-donor F1 interfaces. In addition, the IAB-donor DU 420 and the IAB-MT may be connected through backhaul RLC channels (BH RLC CH). In addition, the IAB-DU and the IAB-donor CU-CP 410 may be connected through F1-C interfaces. F1-C traffic may be transmitted through one-hop backhaul. F1-C traffic between the IAB-DU and the IAB-donor CU-CP 410 may be connected through a backhaul by the wirelessly connected IAB-donor DU 420.

Meanwhile, in the IAB network, the IAB-donor node may configure a routing table in IAB-node 1 430 to perform path configuration for data transmission. In this case, the IAB-donor node may configure the routing table for data transmission and data reception in the IAB-node 1 430 by using a configuration message. Accordingly, the IAB-node 1 430 may perform routing of packets using header information of a BAP packet data unit (PDU). In this case, the IAB-node 1 430 may refer to the routing table configured by the IAB-donor node. As described above, the IAB network may configure a basic path for transmitting or receiving packets using the BAP PDU header information based on the routing table. In this case, the BAP layer may configure the basic path for transmitting or receiving packets. The routing table may basically include an IAB address that can identify the IAB-Node 1 430 and a path identifier that can identify a specific path. In this case, a routing identifier may be a combination of the IAB node and the path identifier.

Meanwhile, the IAB network may transmit packets through a backhaul link between the IAB-donor node and IAB-node 1 430. In this case, the IAB network may distinguish and transmit packets through logical channels. Here, the logical channels may be divided into ingress backhaul RLC channels and egress backhaul RLC channels. Each backhaul RLC channel may include information such as quality of service (QoS) of traffic to be transmitted. Accordingly, the IAB-node 1 430 or the IAB-donor DU 420 may use the QoS information of the traffic to set a transmission priority when transmitting a BAP PDU. These ingress backhaul RLC channels and egress backhaul RLC channels may be configured by the IAB-donor CU-CP 410 of each topology. These configurations may be managed as a mapping table in the IAB-node 1 430 and the IAB-donor DU 420.

In the IAB network, the IAB-donor node may control routing for packet transmission or packet reception of all IAB-nodes included in the IAB network. To this end, the IAB-donor CU-CP 410 may configure a routing table of the DU and MT of the IAB-node 1 430 using the F1-AP layer or the RRC layer, and may configure the backhaul RLC channels. In addition, the IAB-donor CU-CP 410 may configure a routing table of the IAB-donor DU 420 using the F1-AP layer, and configure the backhaul RLC channels.

Figure 5:
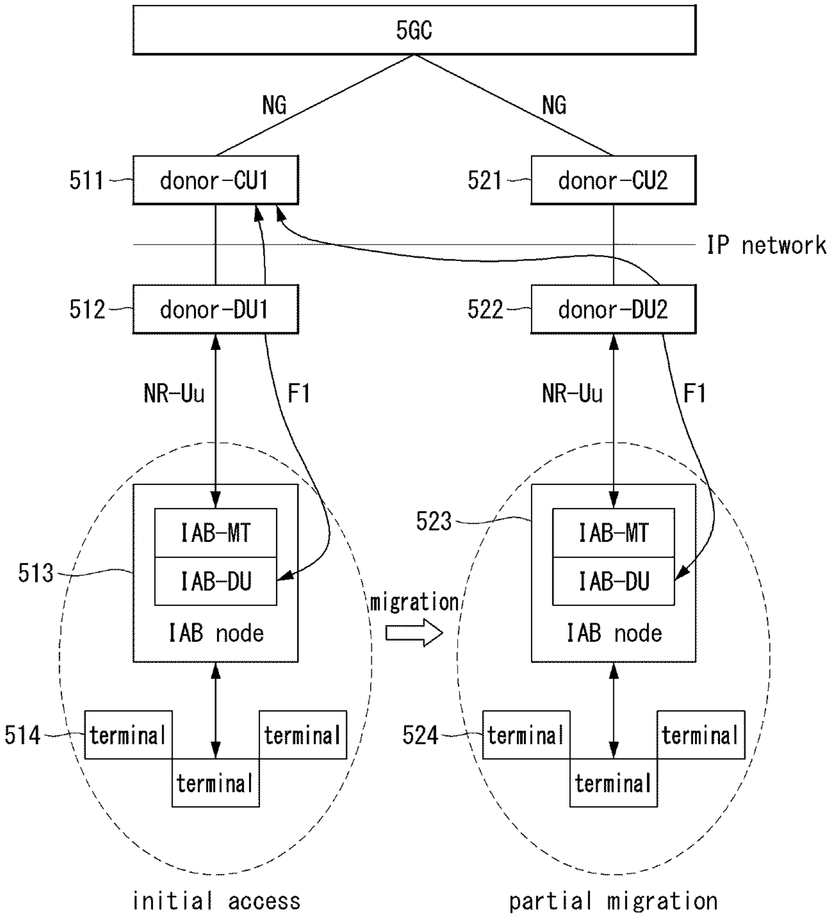
FIG. 5 is a conceptual diagram illustrating a first exemplary embodiment of a handover process in the IAB network.

FIG. 5 is a conceptual diagram illustrating a first exemplary embodiment of a handover process in the IAB network.

Referring to FIG. 5, a partial migration procedure in which a one-hop backhaul IAB-MT handovers to a new DU or CU is illustrated. In an exemplary embodiment, the partial migration procedure may be a technique that changes only an RRC-terminating CU of the IAB-MT while maintaining an F1-terminating CU of the IAB-DU 513 as the donor-CU1 511.

The IAB node 513 may be wirelessly connected to a donor-CU1 511 and a donor-DU1 512 through initial access. Therefore, before performing the partial migration procedure, the donor-CU1 511 may be an RRC-terminating CU of the IAB-MT. The RRC-terminating CU of the IAB-MT may mean that a termination point of RRC transmission is the donor-CU1 511. Alternatively, the donor-CU1 511 may be an F1-terminating CU of the IAB-DU. The F1-terminating CU of IAB-DU may mean that a termination point of the F1 connection is the donor-CU1 511.

When the IAB node 513 performs a partial migration procedure, the IAB-MT may perform a handover procedure from the existing donor-CU1 511 to a donor-CU2 521. In addition, the IAB-MT may perform a handover procedure from the existing donor-DU1 512 to a donor-DU2 522. The IAB-MT of the IAB node 513 may disconnect from the previously-connected donor-CU1 511 and donor-DU1 512. In addition, the IAB-MT of the IAB node 523 may be wirelessly connected to the new donor-CU2 521 and donor-DU2 522. After the handover procedure, the RRC-terminating CU of the IAB-MT may be changed from the donor-CU1 511 to the donor-CU2 521.

When the IAB-node 513 completes the partial migration procedure, the IAB-DU of the IAB node 523 may be connected to the existing donor-CU1 511. The IAB-DU of the IAB node 523 and the donor-CU1 511 may be connected through an F1 interface, and the F1 connection between the IAB-DU of the IAB node 523 and the donor-CU1 511 may correspond to a logical interface. The actual physical connection between the IAB-DU of the IAB node 523 and the donor-CU1 511 may include a wireless connection between the IAB node of the IAB node 523 and the donor-DU2 522 and a connection through the F1 interface with the donor-CU1 511.

When the partial migration procedure of the IAB-node 513 is completed, a user data path of the terminal may be as follows. The 5GC and the donor-CU1 511 may transmit and receive user data of the terminal. The donor-CU1 511 and the donor-CU2 521 may transmit and receive the user data of the terminal. The donor-CU2 521 and the IAB node 523 may transmit and receive the user data of the terminal. The IAB-node 523 and the terminal 524 may transmit and receive the user data of the terminal. As the partial migration procedure is performed, the number of CU nodes through which user data passes may increase. The user data passing through the CU nodes may experience a transmission delay. To resolve the transmission delay, the IAB-node 523 may need to change the F1-terminating CU of the IAB-node 523 through a full migration procedure.

Figure 6A:
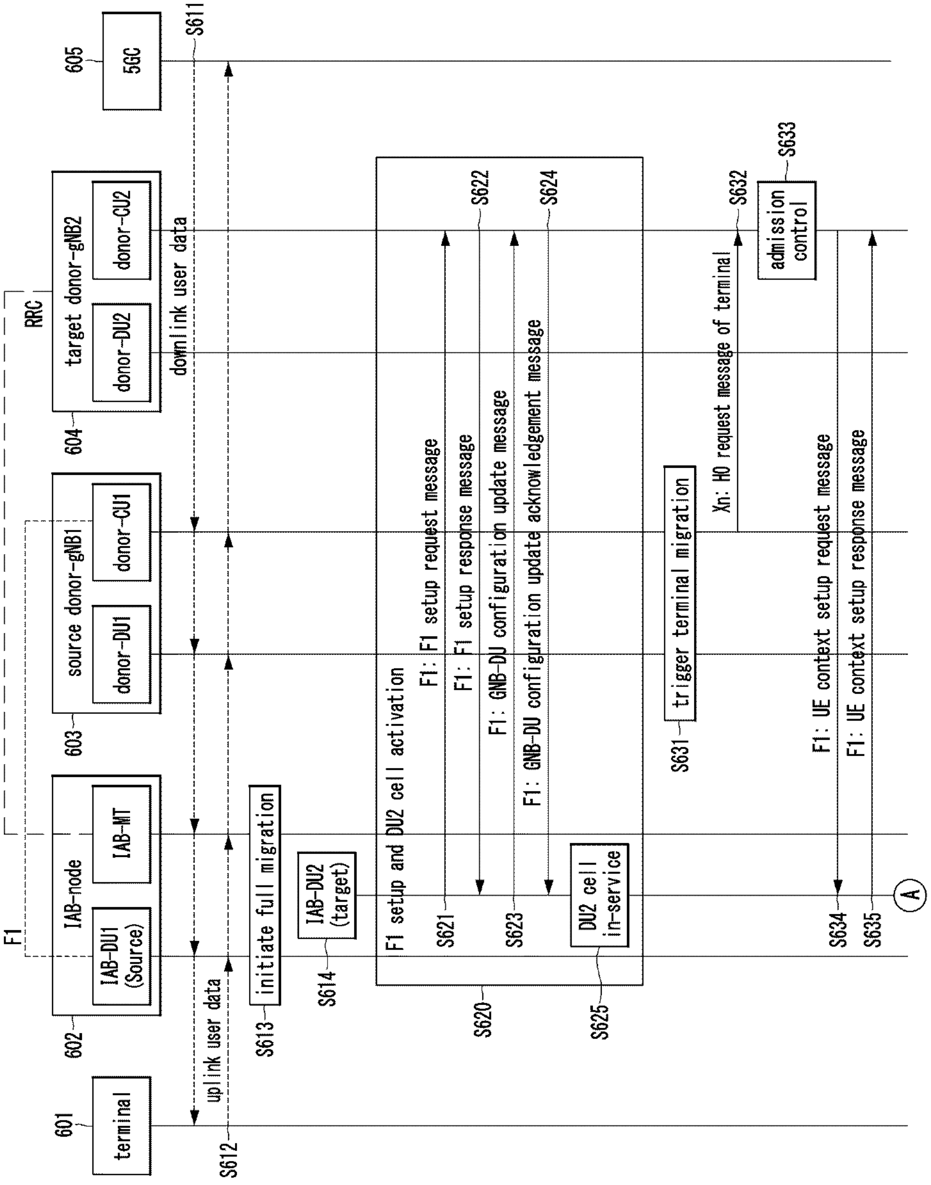
FIG. 6A is a sequence chart illustrating a second exemplary embodiment of a handover process in the IAB network.

FIG. 6A is a sequence chart illustrating a second exemplary embodiment of a handover process in the IAB network.

Referring to FIG. 6A, a full migration procedure of an IAB-node 602 for which a partial migration procedure has been completed is illustrated. In addition, FIG. 6 may illustrate a one-hop IAB structure. Meanwhile, the procedure in FIG. 6A illustrates that the IAB-node 602 for which a partial migration procedure has been completed performs a full migration procedure. The state in which the partial migration procedure has been completed may be as follows.

The terminal 601 may be wirelessly connected to an IAB-DU1 of the IAB-node 602. The IAB-node 602 may access the 5GC 605 by wirelessly connecting an IAB-MT and the donor-DU2 604. The terminal connected wirelessly to the IAB-DU1 may receive data services while being connected to the network.

In a state where the partial migration procedure has been completed, an RRC-terminating CU of the terminal connected to the IAB-node 602 may be a donor-CU1 of a source donor-gNB1 603. In addition, an RRC-terminating CU of the IAB-MT may be a donor-CU2. An F1-terminating CU of the IAB-DU1 602 may be the donor-CU1. The IAB-DU1 may be connected to the donor-CU1 through an F1 interface. In this case, the F1 interface of the IAB-DU1 may be connected to the donor-CU1 using a wireless connection with the donor-DU2.

Meanwhile, the IAB-node may change the RRC-terminating CU of the terminal from the donor-CU1 to the donor-CU2 through full migration. In addition, the IAB-node 602 may change the F1-terminating CU of the IAB-node 602 from the donor-CU1 to the donor-CU2 through the full migration procedure.

Hereinafter, the full migration procedure will be described.

The 5GC may transmit downlink user data to the donor-CU1 of the source donor-gNB1 603 (S611). The donor-CU1 of the source donor-gNB1 603 may receive the downlink user data transmitted by the 5GC. The donor-CU1 of the source donor-gNB1 603 may transmit the downlink user data to the donor-DU1 of the source donor-gNB1. The donor-DU1 of the source donor-gNB1 603 may receive the downlink user data transmitted by the donor-CU1 of the source donor-gNB1 603. The donor-DU1 of the source donor-gNB1 603 may transmit the downlink user data to the IAB-MT. The IAB-MT may receive the downlink user data transmitted by the donor-DU1 of source donor-gNB1 603. The IAB-MT may transmit the downlink user data to the IAB-DU1 of the IAB-node 602. The IAB-DU1 of the IAB-node 602 may receive the downlink user data transmitted by the IAB-MT. The IAB-DU1 of the IAB-node 602 may transmit the downlink user data to the terminal. The terminal may receive the downlink user data transmitted by the IAB-DU1 of the IAB-node 602.

The terminal may transmit uplink user data to the IAB-DU1 of the IAB-node 602 (S612). The IAB-DU1 of the IAB-node 602 may receive the uplink user data transmitted by the terminal. The IAB-DU1 of the IAB-node 602 may transmit the uplink user data to the IAB-MT of the IAB-node 602. The IAB-MT of the IAB-node 602 may receive the uplink user data transmitted by the IAB-DU1 of the IAB-node 602. The IAB-MT of the IAB-node 602 may transmit the uplink user data to the donor-DU1 of the source donor-gNB1 603. The donor-DU1 of the source donor-gNB1 603 may receive the uplink user data transmitted by the IAB-MT of the IAB-node 602. The donor-DU1 of the source donor-gNB1 603 may transmit the uplink user data to the donor-CU1 of the source donor-gNB1 603. The donor-CU1 of the source donor-gNB1 603 may receive the uplink user data transmitted by the donor-DU1 of the source donor-gNB1 603. The donor-CU1 of the source donor-gNB1 603 may transmit the uplink user data to the 5GC. The 5GC may receive the user data transmitted by the donor-CU1 of the source donor-gNB1 603.

The IAB-node 602 may perform a full migration initiation procedure (S613). The full migration initiation procedure may be performed by the IAB-DU1 and the IAB-MT. Once the full migration procedure is initiated, the IAB-node 602 may create a logical IAB-DU2 (S614).

The IAB-node 602 and the target donor-gNB2 604 may perform an F1 Setup procedure and an activation procedure for a cell of the donor-DU2 (S620). The IAB-DU2 may transmit an F1 setup request message to the donor-CU2 (S621). The F1 setup request message may be transmitted through the F1 interface. The F1 setup request message may include information requesting establishment of an F1 connection between the IAB-node 602 and the target donor-gNB2 604. In addition, the F1 setup request message may include cell configuration information desired by the IAB-DU2. The cell configuration information desired by the IAB-DU2 may be generated based on configuration information of a cell of the IAB-DU1 that exists in the same location (i.e., co-located) as a cell of the IAB-DU2. The cell configuration information in the F1 setup request message may include a physical cell ID (PCID). In addition, the cell configuration information in the F1 setup request message may include at least one of a master information block (MIB), system information block type 1 (SIB1), and other system information (OSI) information required for forming a cell. The donor-CU2 may receive the F1 setup request message transmitted by the IAB-DU2. The donor-CU2 may determine information on radio resources required for configuring the cell of the IAB-DU2 by referring to the F1 setup request message. The donor-CU2 may generate an F1 setup response message including information on radio resources allocated based on the F1 setup request message transmitted by the IAB-DU2.

The donor-CU2 may transmit the F1 setup response message to the IAB-DU2 (S622). The F1 setup response message may be transmitted through the F1 interface. The F1 setup response message may include activated cell list information. In addition, the F1 setup response message may include cell configuration information. The cell configuration information may be as follows.

- Cell configuration information that has the same PCID as a PCID of the IAB-DU1 and is partially or entirely the same as cell configuration information of the IAB-DU1
- Cell configuration information that has a PCID different from the PCID of the IAB-DU1 and is partially or entirely the same in cell configuration information of the IAB-DU1

The IAB-DU2 may receive the F1 setup response message transmitted by the donor-CU2. The IAB-DU2, which has received the F1 setup response message, may form a cell according to the cell configuration information in the F1 setup response message. In addition, the IAB-DU2 may activate cells included in the activated cell list.

The IAB-DU2 may transmit a GNB-DU configuration update message to donor-CU2 (S623). The GNB-DU configuration update message may be transmitted through the F1 interface. The IAB-DU2 may notify that it has changed to in-service state through the GNB-DU configuration update message. The in-service state may refer to a state in which an activated cell can provide wireless services to the terminal. The donor-CU2 may receive the GNB-DU configuration update message transmitted by the IAB-DU2. The donor-CU2 may determine whether the IAB-DU2 is in the in-service state based on the GNB-DU configuration update message.

The donor-CU2 may transmit a GNB-DU configuration update acknowledgement message to the IAB-DU2 (S624). The IAB-DU2 may receive the GNB-DU configuration update acknowledgement message transmitted by the donor-CU2. The IAB-DU2, which has received the GNB-DU configuration acknowledgement message, may perform a in-service procedure of the cell of the DU2 (S625).

The donor-DU1 and the donor-CU1 may perform a trigger procedure for terminal migration (S631). The source donor-gNB1 603 may perform a handover procedure for connecting the terminal connected to the cell of the IAB-DU1 to the cell of the IAB-DU2. Meanwhile, since the RRC-termination point of the terminal is the donor-CU1, the donor-CU1 may have terminal context information including radio resource configuration information of the terminal.

The donor-CU1 may transmit a handover (HO) request message for the terminal to the donor-CU2 (S632). The handover request message for the terminal may be transmitted through an Xn interface. The handover request message may include terminal context information including radio resource configuration information of the terminal. The donor-CU2 may receive the handover request message for the terminal transmitted by the donor-CU1.

The donor-CU2, which has received the handover request message, may perform an admission control procedure (S633). The donor-CU2 may generate terminal configuration information by referring to the handover request message. The terminal configuration information may include radio resource configuration information for the terminal. In addition, the terminal configuration information may include the following information.

- Terminal configuration information identical to the terminal configuration information included in the handover request message
- Terminal configuration information that is partially or completely different from the terminal configuration information included in the handover request message The donor-CU2 may transmit a terminal context setup request message to the IAB-DU2 (S634). The terminal context setup request message may be transmitted through the F1 interface. The terminal context setup request message may include terminal configuration information generated by the donor-CU2. The IAB-DU2 may receive the terminal context setup request message transmitted by the donor-CU2. The IAB-DU2 may perform a terminal context setup procedure based on the received terminal context setup request message. Through the terminal context setup procedure, the cell of IAB-DU2 may be in a state where it can provide a connection to the terminal when the terminal initiates a handover procedure.

The IAB-DU2 may transmit a terminal context setup response message to the donor-CU2 (S635). The donor-CU2 may receive the terminal context setup response message transmitted by the IAB-DU2. The donor-CU2 may generate a handover request acknowledgement message by generating RRC reconfiguration information.

Figure 6B:
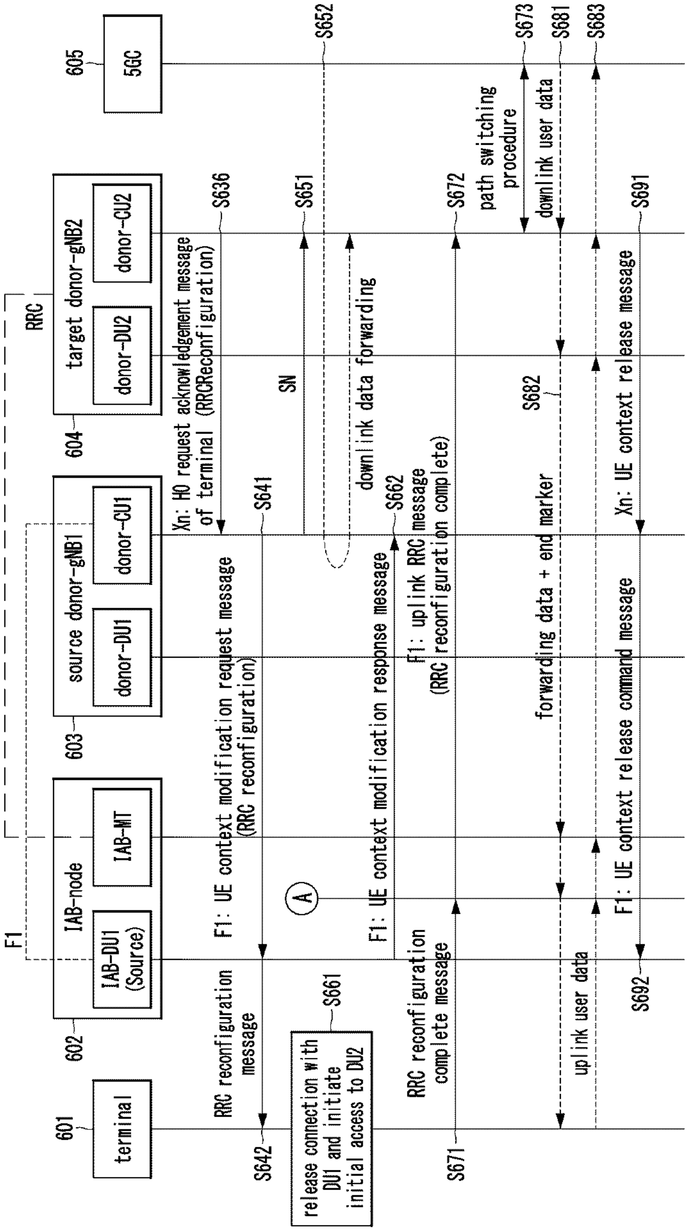
FIG. 6B is a sequence chart illustrating a second exemplary embodiment of a handover process in the IAB network.

FIG. 6B is a sequence chart illustrating a second exemplary embodiment of a handover process in the IAB network. The exemplary embodiment of FIG. 6B may be performed after the exemplary embodiment of FIG. 6A.

Referring to FIG. 6B, the donor-CU2 may transmit a UE handover request acknowledgement message to the donor-CU1 (S636). The terminal's handover request acknowledgement message may be transmitted through an Xn interface.

The terminal's handover request acknowledgement message may include terminal configuration information or RRC reconfiguration information. In addition, the donor-CU1 may receive the terminal's handover request acknowledgement message transmitted by the donor-CU2.

The donor-CU1 may transmit a terminal context modification request message to the IAB-DU1 (S641). The IAB-DU1 may receive the terminal context change request message transmitted by the donor-CU1. The terminal context change request message may include RRC reconfiguration information. The IAB-DU1 may generate an RRC reconfiguration message by receiving the terminal context modification request message from the donor-CU1.

The IAB-DU1 may transmit the RRC reconfiguration message to the terminal (S642). The terminal may receive the RRC reconfiguration message transmitted by the IAB-DU1. The terminal that has received the RRC reconfiguration message may perform a handover procedure to the target cell of the IAB-DU2.

The donor-CU1 nay transmit sequence number (SN) information to the donor-CU2 (S651). The donor-CU2 may receive the SN information transmitted by the donor-CU1.

The 5GC may transmit downlink data to the donor-CU1. The donor-CU1 may forward the downlink data transmitted by the 5GC to the donor-CU2 (S652). The donor-CU2 may receive the downlink data transmitted by the 5GC.

The terminal may perform a connection release procedure with the DU1 (S661). In addition, the terminal may perform an initial access (random access (RA)) initiation procedure with the DU2 (S661). The terminal may terminate the connection with the cell of the IAB-DU1. In addition, the terminal may perform an initial access procedure (e.g., RACH procedure) to a cell of the IAB-DU2 according to a handover command configured in the RRC reconfiguration message.

The IAB-DU1 may transmit a UE context modification response message to the donor-CU1 (S662). The donor-CU1 may receive the UE context change response message transmitted by the IAB-DU1.

The terminal may transmit an RRC reconfiguration complete message to the IAB-DU2 (S671). The terminal that has successfully completed the RACH procedure with the cell of the IAB-DU2 cell may inform the IAB-DU2 that the handover procedure has succeeded through the RRC reconfiguration complete message. The IAB-DU2 may receive the reconfiguration complete message transmitted by the terminal.

The IAB-DU2 may transmit an uplink RRC message to the donor-CU2 (S672). The uplink RRC message may be transmitted through the F1 interface. The uplink RRC message may include RRC reconfiguration complete information. The IAB-DU2 may notify the handover completion through the uplink RRC message transmitted to the donor-CU2. The donor-CU2 may receive the uplink RRC message transmitted by the IAB-DU2.

The donor-CU2 and the 5GC may perform a path switching procedure (S673). Through the path switching procedure, a traffic path of the terminal may be changed from the donor-CU1 to the donor-CU2.

The 5GC may transmit downlink user data to the donor-CU2 (S681). The donor-CU2 may receive the downlink user data transmitted by the 5GC. The donor-CU2 may transmit the downlink user data to the donor-DU2. The donor-DU2 may receive the downlink user data transmitted by the donor-CU2. The donor-DU2 may transmit the downlink user data to the IAB-MT (S682). The downlink user data transmitted by the donor-DU2 may include forwarding data and an end marker. The IAB-MT may receive the downlink user data transmitted by the donor-DU2. The IAB-MT may deliver the downlink user data to the IAB-DU2. The IAB-DU2 may receive the downlink user data delivered by the IAB-MT. The IAB-DU2 may transmit the downlink user data to the terminal. The terminal may receive the downlink user data transmitted by the IAB-DU2.

The terminal may transmit uplink user data to the IAB-DU2 (S683). The IAB-DU2 may receive the uplink user data transmitted by the terminal. The IAB-DU2 may deliver the uplink user data to the IAB-MT. The IAB-MT may receive the uplink user data delivered by the IAB-DU2. The IAB-MT may transmit the uplink user data to the donor-DU2. The donor-DU2 may receive the uplink user data transmitted by the IAB-MT. The donor-DU2 may deliver the uplink user data to the donor-CU2. The donor-CU2 may receive the uplink user data delivered by the donor-DU2. The donor-CU2 may transmit the uplink user data to the 5GC. The 5GC may receive the uplink user data transmitted by the donor-CU2.

The donor-CU2 may transmit a UE context release message to the donor-CU1 (S691). The UE context release message may be transmitted through the Xn interface. The donor-CU1 may receive the UE context release message transmitted by the donor-CU2.

The IAB-DU1 may receive the terminal context release command message transmitted by the donor-CU1. The IAB-DU1 may release context of the terminal. The cell of the IAB-DU1 may be turned off, and only the IAB-DU2 cell, which is the target cell, may operate.

Meanwhile, the terminal previously connected to the IAB-node 602 may be connected to the IAB-DU2 through the full migration procedure. The RRC-terminating CU of the terminal may be changed to the donor-DU2. In addition, the F1 interface of the IAB-node 602 may be changed to the donor-CU2.

Figure 7:
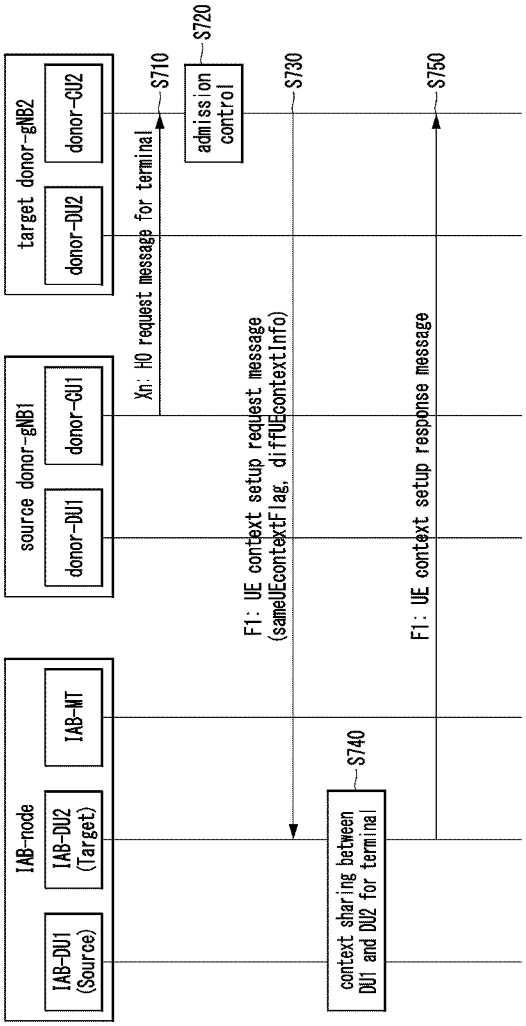
FIG. 7 is a flowchart illustrating an exemplary embodiment of a process for reducing a signaling message size.

FIG. 7 is a flowchart illustrating an exemplary embodiment of a process for reducing a signaling message size.

Referring to FIG. 7, a procedure for reducing an F1 signaling message size according to an exemplary embodiment of the present disclosure is illustrated. In addition, FIG. 7 illustrates a procedure for requesting handover of a terminal.

The present disclosure proposes a method of reducing excessive signaling overhead of signaling messages transmitted on a wireless link between the IAB-node and the target donor-gNB2. As a method of reducing signaling overhead, a method of reducing the size of a signaling message may be used. A method of reducing the size of the signaling message may be referred to as 'first method'.

The first method may be a method of not transmitting UE context information element held by a source cell of the IAB-node when the terminal performs a group handover. The first method may be a method in which a target node generates an F1AP signaling message composed of a newly changed UE context information element and transmits it to the terminal. In the present disclosure, when configuring an RRCReconfigurationWithSync message, which is a handover command (i.e., HO command) message, terminal reconfiguration information already held by the terminal may not be transmitted.

In addition, according to the present disclosure, the IAB-DU1 may not include the terminal reconfiguration information element previously held in the UE context setup request message. In addition, the UE context setup request message may be transmitted including only newly changed UE reconfiguration information elements. The IAB-DU2 may configure UE context by acquiring the omitted terminal radio resource configuration information through a sharing procedure with the IAB-DU1.

The donor-CU1 may transmit a handover request message for the terminal to the donor-CU2 (S710). The handover request message may include terminal radio resource configuration information. The donor-CU2 may receive the handover request message for the terminal transmitted by the donor-CU1.

The donor-CU2 may perform an admission control procedure (S720). The donor-CU2 may newly configure terminal radio resource reconfiguration information based on the terminal radio resource configuration information in the handover request message. In this case, the terminal radio resource reconfiguration information of the donor-CU2 may be configured to be partially identical to the UE context information element of the handover request message. In addition, the terminal radio resource configuration information to be reconfigured by the donor-CU2 may be configured to include terminal radio resource reconfiguration information that is entirely identical to the UE context information element of the handover request message.

The donor-CU2 may transmit a UE context setup request message to the IAB-DU2 (S730). The UE context setup request message may include new terminal radio resource reconfiguration information. In addition, the UE context setup request message may include at least one of sameUEcontextFlag or diffUEcontextInfo. In this case, the UE context setup request message may be transmitted by distinguishing whether or not it is the same information element as the terminal radio resource configuration information held by the IAB-DU1.

If the terminal radio resource reconfiguration information of the donor-CU2 includes a terminal UE radio resource configuration information element that is different from the terminal radio resource configuration information element held by the IAB-DU1, the donor-CU2 may generate a new value for the different terminal radio resource configuration information element. The terminal radio resource configuration information newly generated by the donor-CU2 may be referred to as 'first information'. The Donor-CU2 may transmit the first information together with the UE context setup request message. The IAB-DU2 may receive the UE context setup request message transmitted by the donor-CU2. The IAB-DU2 may obtain the first information transmitted by the donor-CU2.

If the terminal radio resource configuration information of the donor-CU2 includes the same terminal radio resource configuration information element as the terminal radio resource configuration information element held by the IAB-DU1, the same terminal radio resource configuration information element may be referred to as 'second information'.

The IAB-DU2 may perform a context sharing procedure with the IAB-DU1 (S740). The IAB-DU2 may obtain the second information through the information sharing procedure with the IAB-DU1. Specifically, the IAB-DU2 may obtain the terminal radio resource configuration information by sharing terminal radio resource information between the IAB-DU1 and the IAB-DU2.

The IAB-DU2 may generate complete terminal reconfiguration information by combining the first information and the second information. The IAB-DU2 may configure a cell based on the complete UE context information.

The IAB-DU2 may transmit a UE context setup response message to the donor-DU2 (S750). The donor-DU2 may receive the UE context setup response message transmitted by the IAB-DU2.

Meanwhile, the UE context setup request message may include a CU-to-DU RRC information element. The CU-to-DU RRC information element may include at least one of CG-Configuration information (CG-ConfigInfo), terminal RAT capability container list (UE-CapabilityRAT-ContainerList), measurement configuration (MeasConfig), handover preparation Information, cell group configuration (CellGroupConfig), measurement timing configuration, UE assistance information (UEAssistanceInformation), CG-Configuration information (CG-Config), or location measurement Information. Further, the handover preparation information may include at least one of source configuration (sourceConfig), RRM configuration (rrm-Config), or as-Context (as-Context).

The IAB-DU1 may have the UE-CapabilityRAT-ContainerList information element and/or source configuration (sourceConfig) information element in advance. Accordingly, the UE context setup request message may not include UE-CapabilityRAT-ContainerList information element and/or source configuration (sourceConfig) information element.

The cell group configuration (CellGroupConfig) information element may include the UE radio resource reconfiguration information. Therefore, information assigned the same information as the terminal radio resource reconfiguration information of the IAB-DU1 in the cell group configuration (CellGroupConfig) information element may not be transmitted as being included in the UE context request message.

Figure 8:
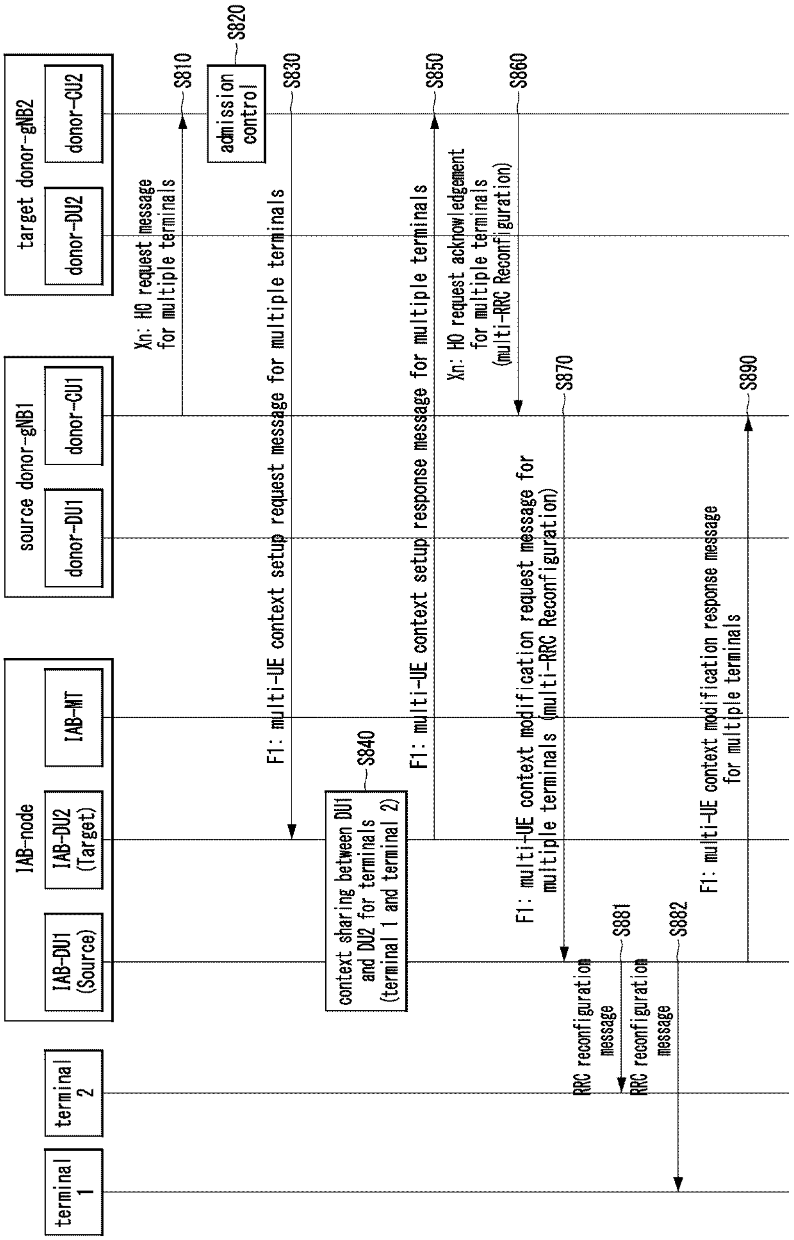
FIG. 8 is a sequence chart illustrating an exemplary embodiment of a process for reducing the number of signaling messages.

FIG. 8 is a sequence chart illustrating an exemplary embodiment of a process for reducing the number of signaling messages.

FIG. 8 illustrates a procedure for reducing the number of F1 signaling messages. In particular, FIG. 8 illustrates a procedure for reducing the number of F1 signaling messages transmitted on a wireless link.

In a SCTP protocol layer, a 24-byte SCTP header may be added to an F1AP message, and the F1AP message with the SCTP header may be transmitted to an IP layer. An IP header of 20 bytes (in case of IPv4) may be added to a SCTP PDU of the F1AP message, and the F1AP message with the SCTP header may be transmitted to a BAP layer. Here, reducing the number of F1AP messages may reduce the overhead due to signaling message headers in the wireless section between the IAB-node and the donor-DU. The present disclosure proposes an F1 signaling message for conveying multiple UE contexts for group handover of UEs connected to an IAB-node.

A way to reduce signaling overhead may be to reduce the number of signaling messages. The method of reducing the number of signaling messages may be referred to as 'second method'. The second method may be a method of transmitting multiple terminal messages in one F1AP signaling message to reduce the number of signaling messages.

The donor-CU1 may transmit a handover request message for multiple terminals to the donor-CU2 (S810). The handover request message may include UE radio resource configuration information. The donor-CU2 may receive the handover request message for multiple terminals transmitted by the donor-CU1.

The donor-CU2 may perform an admission control procedure (S820). The donor-CU2 may generate a multi-UE context setup request message in a list form having multiple existing UE context request messages.

The donor-CU2 may transmit the multi-UE context setup request message for multiple terminals to the IAB-DU2 (S830). The IAB-DU2 may receive the multi-UE context setup request message for multiple terminals transmitted by the donor-CU2.

The IAB-DU2 may perform a context sharing procedure with the IAB-DU1 (S840).

The IAB-DU2 may transmit a multi-UE context setup response message for multiple terminals to the donor-DU2 (S850). The donor-DU2 may receive the multi-UE context setup response message for multiple terminals transmitted by the IAB-DU2.

The donor-CU2 may transmit a handover request acknowledgement message for multiple terminals to the donor-CU1 (S860). The handover request acknowledgement message for multiple terminals may include multi-RRC reconfiguration information. The donor-CU1 may receive the handover request acknowledgement message for multiple terminals transmitted by the donor-CU2.

The donor-CU1 may transmit a multi-UE context modification request message for multiple terminals to the IAB-DU1 (S870). The multi-UE context change request message for multiple terminals may include multi-RRC reconfiguration information. The multi-UE context modification request message may be a message that transmits existing UE context change request messages in a list form. The IAB-DU1 may receive the multi-UE context modification response message for multiple terminals transmitted by the donor-CU1.

The IAB-DU1 may transmit an RRC reconfiguration message to a terminal 2 (S881). The RRC reconfiguration message transmitted from the IAB-DU1 to the terminal 2 may mean one message. The terminal 2 may receive the RRC reconfiguration message transmitted by the IAB-DU1. The IAB-DU1 may transmit an RRC reconfiguration message to a terminal 1 (S882). The RRC reconfiguration message transmitted from the IAB-DU1 to the terminal 1 may mean one message. The terminal 1 may receive the RRC reconfiguration message transmitted by the IAB-DU1.

The IAB-DU1 may transmit a multi-UE context modification response message for multiple terminals to the donor-CU1 (S890). The multi-UE context modification response message may be a message that transmits existing UE context modification response messages in a list form. The donor-CU1 may receive the multi-UE context modification response message for multiple terminals transmitted by the IAB-DU1.

The following show a structure of the multi-UE context setup request message. The multi-UE context setup request message may be transmitted from the gNB-CU to the gNB-DU.

TABLE 1

| IE/group name | presence | range | IE type and reference | Semantics description |
|---|---|---|---|---|
| Message type | M | | | |
| UE context to be setup List | O | 0 . . . maxUECtxtSetup | | |
| >UE context to be setup Item | M | | UE context setup request message | |

Referring to Table 1, the multi-UE context setup request message may define, for each information element (IE), presence, range, information element type and reference, and semantics description. In the multi-UE context setup request message, the IEs may include a message type, UE context to be setup List, and UE context to be setup Item.

The following show a structure of the multi-UE context setup response message. The multi-UE context setup response message may be transmitted from the gNB-DU to the gNB-CU.

TABLE 2

| IE/group name | presence | range | IE type and reference | Semantics description |
|---|---|---|---|---|
| Message type | M | | | |
| UE context to be setup_resp List | O | 0 . . . maxUECtxtSetup | | |
| >UE context to be setup_resp Item | M | | UE context setup response message | |

Referring to Table 2, the multi-UE context setup response message may define, for each IE, presence, range, information element type and reference, and semantic description. In the multi-UE context setup response message, the IEs may include a message type (Message Type), UE context to be setup_resp List, and UE context to be setup_resp Item.

Meanwhile, the present disclosure may propose a method of reducing the RRC message size as an exemplary embodiment. Through the present exemplary embodiment, signaling overhead may be reduced when performing a group handover procedure for terminals. The handover of a terminal connected to a mobile IAB-node may be an intra-node handover that occurs within the same node. The same node may mean a node composed of a source IAB-DU and a target IAB-DU. In addition, the intra-node handover may refer to a handover between the source IAB-DU and the target IAB-DU. Each of the source IAB-DU and target IAB-DU may form a cell. Cell configuration information of the source cell may be similar to cell configuration information of the target cell. The terminal may perform a handover procedure between the cells belonging to the same node. Therefore, when performing the handover procedure between the cells belonging to the same node, radio resource information of the terminal may be configured similarly between the cells.

The present disclosure proposes a first exemplary embodiment of reducing the RRC message size. As the first exemplary embodiment to reduce the RRC message size, when transmitting RRCReconfigurationWithSync, which is a handover command for the terminal, the target base station may transmit the handover command by distinguishing information elements identical between configuration information of the serving cell to which the terminal is currently connected and configuration information of the target cell. The terminal that has received the handover command message may use the information element in the configuration information of the serving cell, which is indicated to be the same as that of the configuration information of the target cell. The terminal may use an information element of the configuration information transmitted by the handover command message, which is indicated to be different from that of the configuration information of the serving cell. The terminal may reconfigure the target cell using the cell configuration information of the serving cell and the cell configuration information transmitted by the handover command message. In the present disclosure, the target cell may mean a cell formed by the IAB-DU2. In the present disclosure, the source cell may mean a cell formed by the IAB-DU1.

The present disclosure proposes a second exemplary embodiment for reducing the RRC message size. As the second exemplary embodiment to reduce the RRC message size, when transmitting RRCReconfigurationWithSync, which is a handover command for the terminal, the target base station may transmit the handover command by distinguishing terminal radio resource configuration information elements identical in terminal radio resource configuration information of the serving cell to which the terminal is currently connected and terminal radio resource configuration information of the target cell. The terminal that has received the handover command message may use the information element of the terminal radio resource configuration information of the serving cell, which is indicated to be the same as that of the terminal radio resource configuration information configured by the serving cell. The terminal may use the information element of the terminal radio resource configuration information transmitted in the handover command message, which is indicated to be different from that of the terminal radio resource configuration information of the serving cell. The terminal may reconfigure the terminal using the terminal radio resource configuration information of the serving cell and the terminal radio resource configuration information transmitted by the handover command message.

Figure 9A:
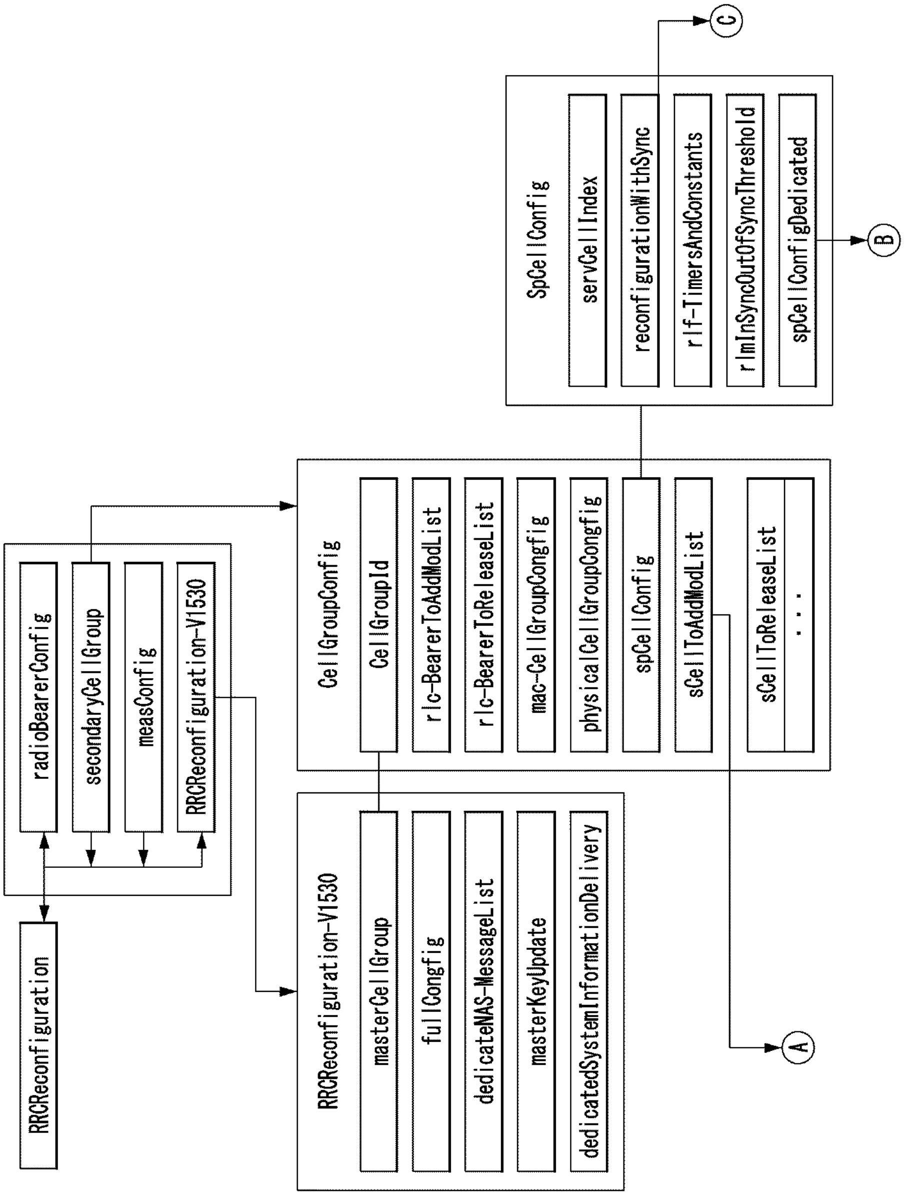
FIG. 9A is a conceptual diagram illustrating an exemplary embodiment of information elements included in a handover command message.

FIG. 9A is a conceptual diagram illustrating an exemplary embodiment of information elements included in a handover command message.

Referring to FIG. 9A, information elements included in a handover command message are illustrated. In the present exemplary embodiment, the target donor may reduce the size of the handover command message by distinguishing terminal radio resource configuration information included in the handover command message.

The handover command message may include RRC reconfiguration information. The IAB-DU1 may transmit the RRC reconfiguration information. The RRC reconfiguration information may include at least one of the radioBearerConfig information element or the rlcBearerToAddModList information element.

The radioBearerConfig or rlcBearerToAddModList information element may include terminal radio resource configuration information. If terminal radio resource configuration information of the target cell has the same information elements as terminal radio resource configuration information of the source cell, the IAB-DU1 may generate information indicating the same information elements, and include the information in the radioBearerConfig information element or the rlcBearerToAddModList information element. The IAB-DU1 may transmit the information indicating the same terminal radio resource configuration information elements to the terminal. In addition, the IAB-DU1 may reduce the size of the handover command message by generating radioBearerConfig or rlcBearerToAddModList including only information elements different from those of the terminal radio resource configuration information of the source cell, and transmitting the radioBearerConfig or rlcBearerToAddModList.

Figure 9B:
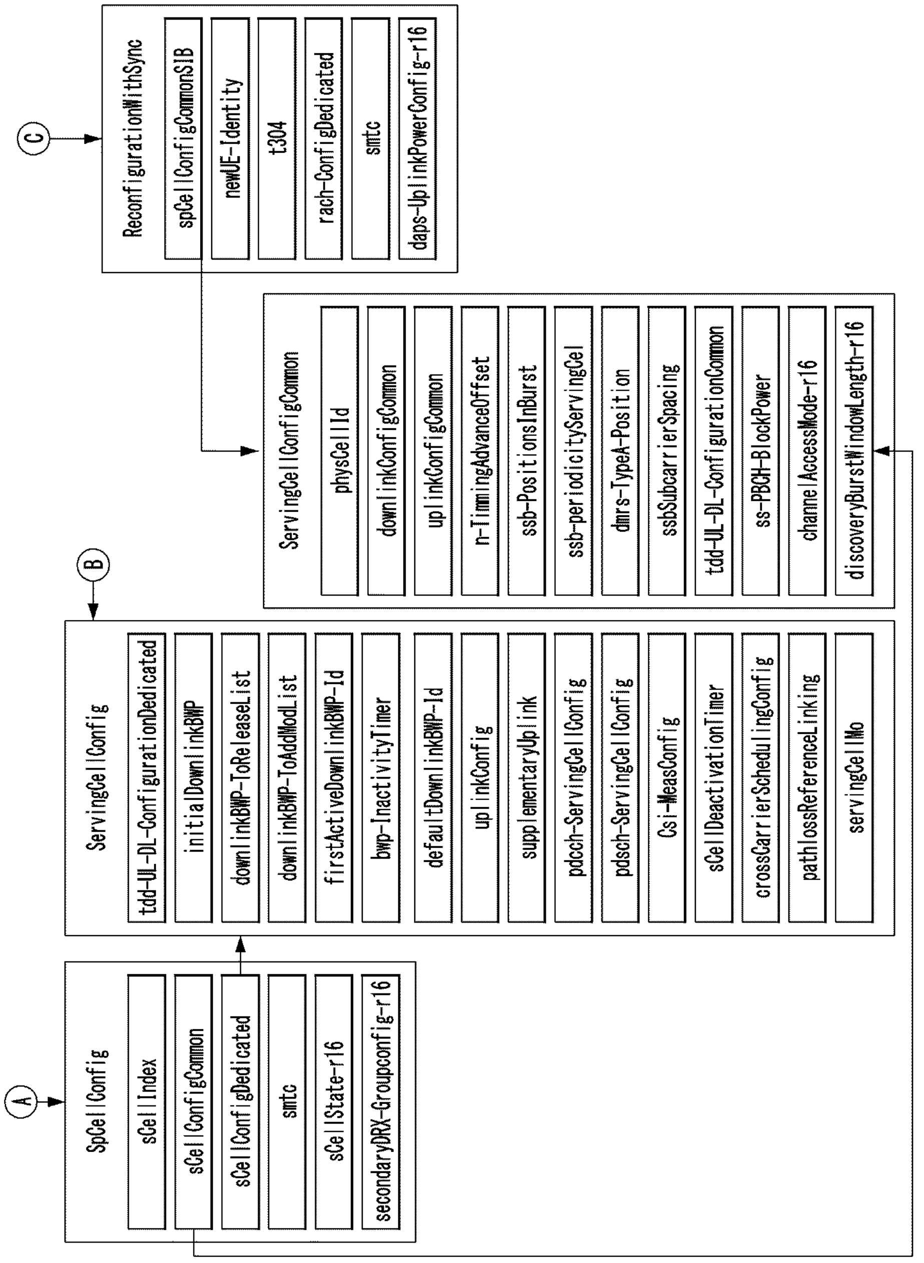
FIG. 9B is a conceptual diagram illustrating an exemplary embodiment of information elements included in a handover command message.

FIG. 9B is a conceptual diagram illustrating an exemplary embodiment of information elements included in a handover command message.

Referring to FIG. 9B, information elements included in a handover command message are illustrated. In the present exemplary embodiment, the target donor may reduce the size of the handover command message by distinguishing cell configuration information included in the handover command message.

The handover command message may include RRC reconfiguration information. The IAB-DU1 may transmit the RRC reconfiguration information to the terminal. The RRC reconfiguration information may include an spCellConfigCommonSIB information element.

The spCellConfigCommonSIB information element may include configuration information of the target cell. When configuration information of the target cell includes the same information elements as configuration information of the source cell, the IAB-DU1 may generate information indicating the same information elements, and include it in the spCellConfigCommonSIB information element. The target donor may transmit the information indicating the same information elements to the terminal. In addition, the IAB-DU1 may reduce the size of the handover command message by transmitting only information elements that are different from the configuration information of the source cell in the spCellConfigCommonSIB information element.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of an integrated access and backhaul (IAB) node including an IAB-distributed unit 1 (DU1) connected to a source base station, an IAB-DU2 connected to a target base station, and an IAB-mobile terminal (MT), comprising:

receiving, from the target base station and via the IAB-DU2, one or more user equipment (UE) context setup request messages including terminal radio resource reconfiguration information;

generating terminal reconfiguration information through a context sharing procedure for sharing the terminal radio resource reconfiguration information between the IAB-DU1 and the IAB-DU2; and reconfiguring a terminal based on the terminal reconfiguration information, and transmitting one or more UE context setup response messages to the target base station in response to the one or more UE context setup request messages, wherein the context sharing procedure includes:

identifying first information including information element(s) newly generated by the target base station and second information including information element(s) already held by the IAB-DU1 based on the terminal radio resource reconfiguration information; and combining the first information and the second information to generate the terminal reconfiguration information.

2. The method according to claim 1, further comprising:

receiving, from a source base station, one or more UE context modification request messages including radio resource control (RRC) reconfiguration information;

transmitting an RRC reconfiguration message including the RRC reconfiguration information to the terminal; and transmitting one or more UE context modification response messages to the source base station in response to the one or more UE context modification request messages.

3. The method according to claim 1, wherein each of the one or more UE context setup request messages indicates the first information and the second information in a distinguishable manner.

4. The method according to claim 2, further comprising:

receiving, from the target base station, one multi-UE context setup request message including a plurality of UE context setup request messages;

transmitting, to the target base station, one multi-UE context setup response message including a plurality of UE context setup response messages;

receiving, from a source base station, one multi-UE context modification request message including a plurality of UE context modification request messages; and transmitting, to the source base station, one multi-UE context modification response message including a plurality of UE context change response messages.

5. The method according to claim 2, wherein the RRC reconfiguration message includes information indicating cell configuration information element same as cell configuration information element(s) held by the serving cell, and/or new cell configuration information element(s) configured by a target cell.

6. The method according to claim 2, wherein the RRC reconfiguration message includes information indicating radio resource configuration information element(s) same as radio resource configuration information element(s) held by the serving cell, and/or new radio resource configuration information element(s) configured by a target cell.

7. An integrated access and backhaul (IAB) node that includes an IAB-distributed unit 1 (DU1) connected to a source base station, an IAB-DU2 connected to a target base station, and an IAB-mobile terminal (MT), and includes at least one processor, wherein the at least one processor causes the IAB node to perform:

receiving, from the target base station and via the LAB-DU2, one or more user equipment (UE) context setup request messages including terminal radio resource reconfiguration information;

generating terminal reconfiguration information through a context sharing procedure for sharing the terminal radio resource reconfiguration information between the IAB-DU1 and the IAB-DU2; and reconfiguring a terminal based on the terminal reconfiguration information, and transmitting one or more UE context setup response messages to the target base station in response to the one or more UE context setup request messages, wherein in the context sharing procedure, the at least one processor further causes the IAB node to perform:

identifying first information including information element(s) newly generated by the target base station and second information including information element(s) already held by the IAB-DU1 based on the terminal radio resource reconfiguration information; and combining the first information and the second information to generate the terminal reconfiguration information.

8. The IAB node according to claim 7, wherein the at least one processor further causes the IAB node to perform:

receiving, from a source base station, one or more UE context modification request messages including radio resource control (RRC) reconfiguration information;

transmitting an RRC reconfiguration message including the RRC reconfiguration information to the terminal; and transmitting one or more UE context modification response messages to the source base station in response to the one or more UE context modification request messages.

9. The IAB node according to claim 7, wherein each of the one or more UE context setup request messages indicates the first information and the second information in a distinguishable manner.

10. The IAB node according to claim 8, wherein the at least one processor further causes the IAB node to perform:

receiving, from the target base station, one multi-UE context setup request message including a plurality of UE context setup request messages;

transmitting, to the target base station, one multi-UE context setup response message including a plurality of UE context setup response messages;

receiving, from a source base station, one multi-UE context modification request message including a plurality of UE context modification request messages; and transmitting, to the source base station, one multi-UE context modification response message including a plurality of UE context change response messages.

11. The IAB node according to claim 8, wherein the RRC reconfiguration message includes information indicating cell configuration information element same as cell configuration information element(s) held by the serving cell, and/or new cell configuration information element(s) configured by a target cell.

12. The IAB node according to claim 8, wherein the RRC reconfiguration message includes information indicating radio resource configuration information element(s) same as radio resource configuration information element(s) held by the serving cell, and/or new radio resource configuration information element(s) configured by a target cell.

* * * * *